(12) United States Patent
Kazmer

(10) Patent No.: US 7,175,418 B2
(45) Date of Patent: Feb. 13, 2007

(54) MELT CONTROL SYSTEM FOR INJECTION MOLDING

(75) Inventor: David O. Kazmer, North Andover, MA (US)

(73) Assignee: University of Massachusetts, Worcester, MA (US)

( * ) Notice: Subject to any disclaimer, the term of this patent is extended or adjusted under 35 U.S.C. 154(b) by 399 days.

(21) Appl. No.: 10/701,111

(22) Filed: Nov. 4, 2003

(65) Prior Publication Data
US 2004/0119182 A1    Jun. 24, 2004

Related U.S. Application Data

(60) Provisional application No. 60/423,395, filed on Nov. 4, 2002.

(51) Int. Cl.
*B29C 45/23* (2006.01)

(52) U.S. Cl. ...................................... 425/564; 425/566

(58) Field of Classification Search ................ 425/812, 425/562, 588, 563, 564, 565, 566
See application file for complete search history.

(56) References Cited

U.S. PATENT DOCUMENTS

| 2,531,726 | A |   | 11/1950 | Durdin |
| 3,767,339 | A |   | 10/1973 | Hunkar |
| 4,781,572 | A | * | 11/1988 | Boring ........................ 425/564 |
| 4,931,234 | A | * | 6/1990  | Schad et al. ................. 425/588 |
| 5,830,524 | A | * | 11/1998 | Braun ......................... 425/562 |
| 6,042,361 | A | * | 3/2000  | Murphy ....................... 425/812 |

\* cited by examiner

*Primary Examiner*—Tim Heitbrink
(74) *Attorney, Agent, or Firm*—Nutter, McClennen & Fish LLP

(57) ABSTRACT

A method and apparatus for proportioning flow and controlling pressure to a gate of an injection mold. The invention decouples the control surface from the gate closure to reduce the required actuation force. Methods for estimating the pressure and flow rate entering the injection mold are included.

11 Claims, 5 Drawing Sheets

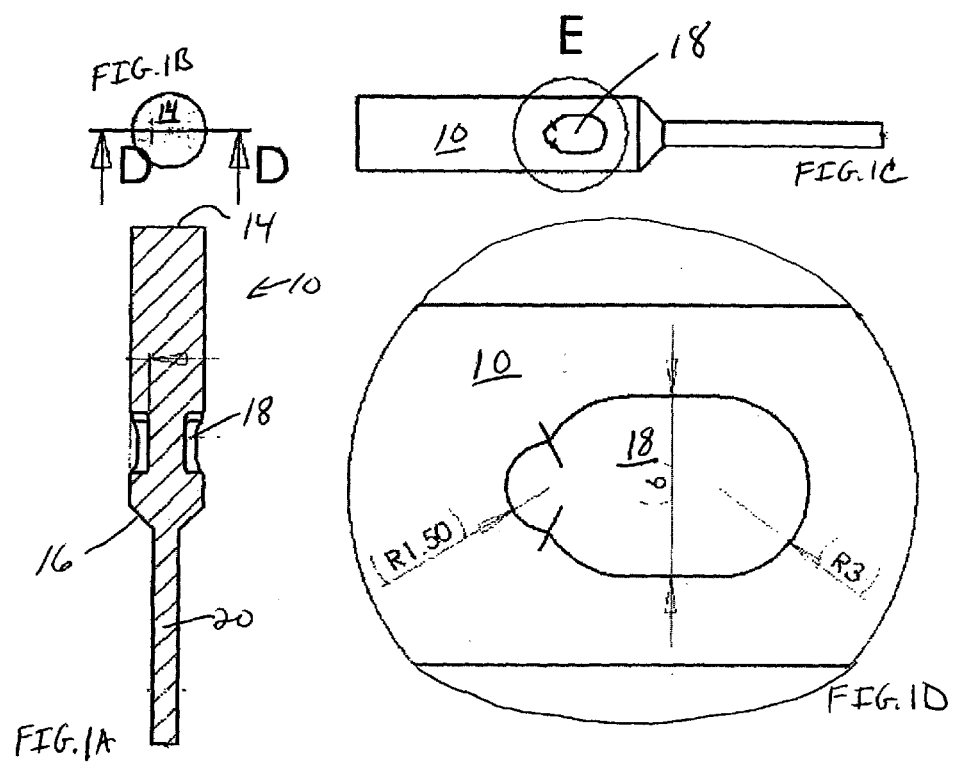

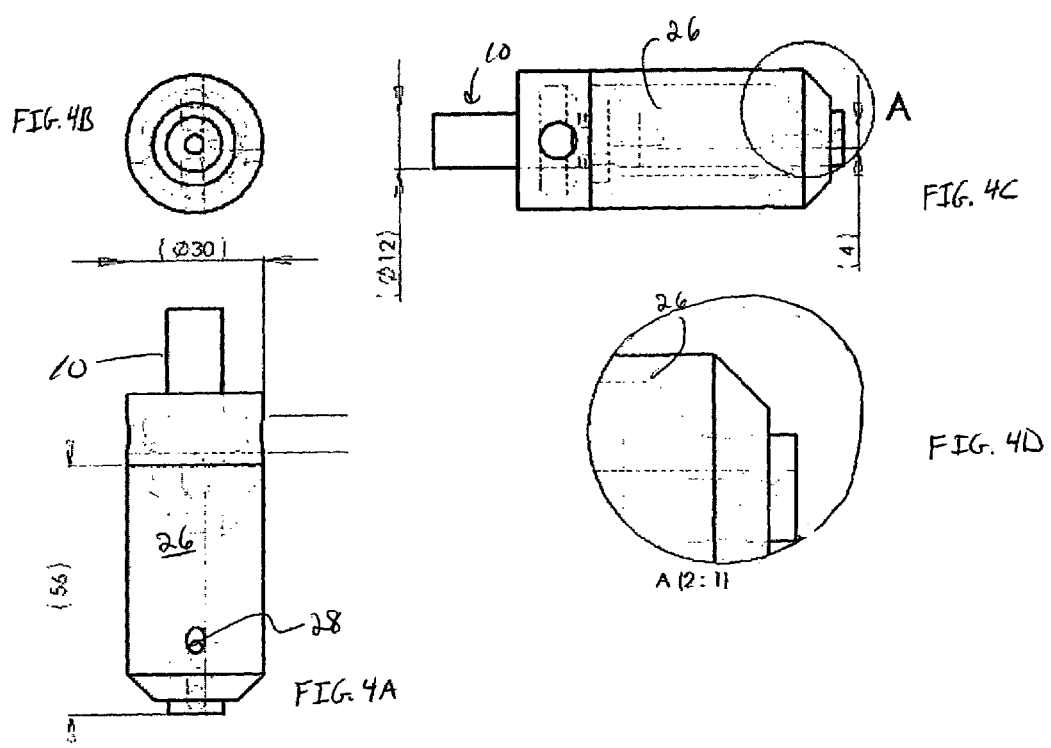

MELT CONTROL SYSTEM FOR INJECTION MOLDING

REFERENCE TO RELATED APPLICATION

This application claims priority from U.S. Provisional patent application Ser. No. 60/423,395, filed on Nov. 4, 2002, now abandoned entitled "A Melt Control System for Injection Molding," which is expressly incorporated by reference herein.

BACKGROUND OF THE INVENTION

The invention relates generally to apparatus and methods for controlling the flow of a polymer melt, and in particular, controlling a polymer melt flow with the use of a spool valve.

Hot runners are used in injection molding to deliver polymer melt from the nozzle of the injection molding machine to the mold cavity. Typically, multiple drops and gates are used in a hot runner system to deliver the melt to a plurality of locations in the mold so as to form multiple parts from corresponding cavities, or to form complex parts that require injection of the melt at multiple locations in a single cavity.

In conventional feed systems, the volumetric flow rate and pressure of polymer melt is determined by the design of the feed system. Once machined, conventional feed systems are unable to significantly change the behavior of flow entering the cavity at one location without similarly affecting the flow of plastic at other locations or retooling the feed system. As such, the molder is sometimes limited in achieving the desired quality or economic performance in a molding application.

To achieve greater process flexibility and consistency, systems have been developed to dynamically control the pressure at multiple points in a feed system by varying the gap between the bore of a hot runner and an axially displaced valve pin. While the resulting methods provide improved process flexibility and consistency, the performance of these systems are limited by complexity, cost, size, shear degradation, energy consumption, and maintenance issues associated with the system's conceptual design.

SUMMARY OF THE INVENTION

The present invention provides a plastic melt flow control apparatus comprising a spool valve having at least one recessed area and a housing positioned around the spool valve. The spool valve is capable of axial movement within the housing, such that a flow port defined by the recessed area and an adjacent wall of the housing can be opened and closed by the axial movement. In particular, axial movement of the spool value can be used to control the flow of plastic melt through the flow port.

In another aspect of the invention, the apparatus can include a gate positioned downstream from the flow port for controlling the flow of the polymer melt flow. An extended valve pin on the spool valve can preferably open and close the gate. Preferably, axial movement of the spool valve controls both the flow of polymer melt through the flow port and through the gate simultaneously.

In another embodiment of the present invention, venting ports in the apparatus provide a path from outside the apparatus to an internal cavity. Preferably, the vents maintain the internal cavity at atmospheric pressure. The internal cavity can also house a portion of the spool valve.

Another embodiment of the present invention includes a method of controlling the flow of a polymer melt including a feed system comprising a spool valve, the spool valve having at least one recessed area defining a flow port and being positioned within a housing, the spool valve being capable of axial movement within the housing. The method further includes axially moving the spool valve to control the polymer melt flow through the flow port.

BRIEF DESCRIPTION OF THE DRAWINGS

The invention will be more fully understood from the following detailed description taken in conjunction with the accompanying drawings:

FIG. 1A illustrates the device of the present invention in a full view;

FIG. 1B illustrates the device of FIG. 1A in a top view;

FIG. 1C illustrates another embodiment of the device shown in FIG. 1A;

FIG. 1D illustrates a partial view of the device of FIG. 1C;

FIG. 4A illustrates the device of the present invention shown in a schematic view;

FIG. 4B illustrates the device of FIG. 4A in a bottom view;

FIG. 4C illustrates another schematic view of the device shown in FIG. 4A;

FIG. 4D illustrates a partial view of the device of FIG. 4C; and

DETAILED DESCRIPTION OF THE INVENTION

The present invention provides a simple, inexpensive, and compact system for dynamically controlling the flow rate and pressure at multiple points in a feed system while incurring minimal shear degradation, energy consumption and maintenance. These advances are enabled by the design of a sliding spool valve 10 illustrated in FIGS. 1A through 1D. The force of the melt pressure preferably acts on the spool valve 10 in the transverse direction, as such, the spool valve 10 requires negligible force for actuation in the axial direction. Accordingly, larger control surface can be used to minimize shear degradation and pressure drop through the valve while decreasing response time and power consumption.

The spool valve 10 is preferably exposed to atmospheric pressure on both its top end 14 and bottom end 16 as shown in FIGS. 2A through 3B. Flow ports 18 (FIG. 3B) can be subject to very high melt pressure, but with negligible axial force acting on the spool valve 10. Accordingly, the spool valve can be actuated with minimal force.

Figure 2A:
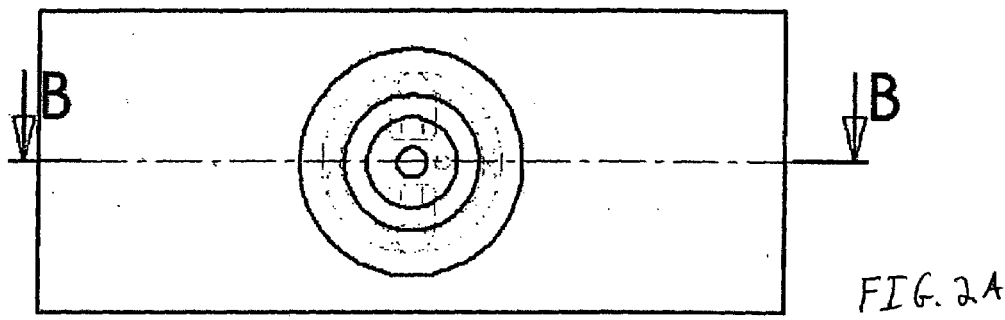
FIG. 2A illustrates the device of the present invention in a bottom view.
Figure 2B:
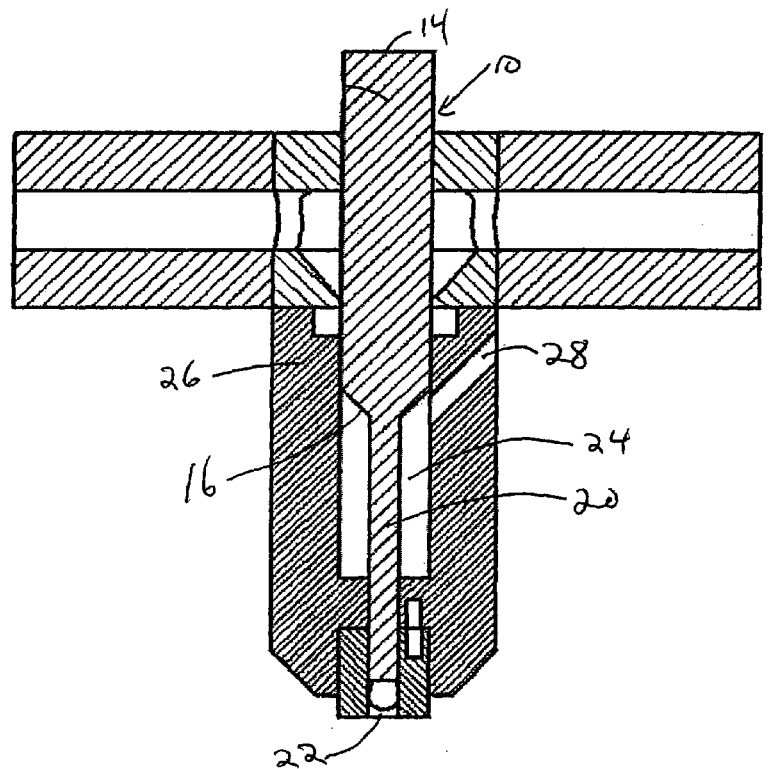
FIG. 2B illustrates the device of FIG. 2A shown in cross section.
Figure 3A:
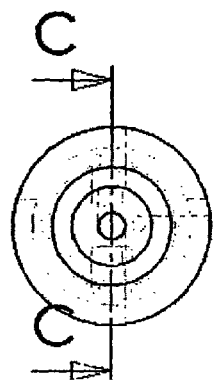
FIG. 3A illustrates the device of the present invention in a bottom view.
Figure 3B:
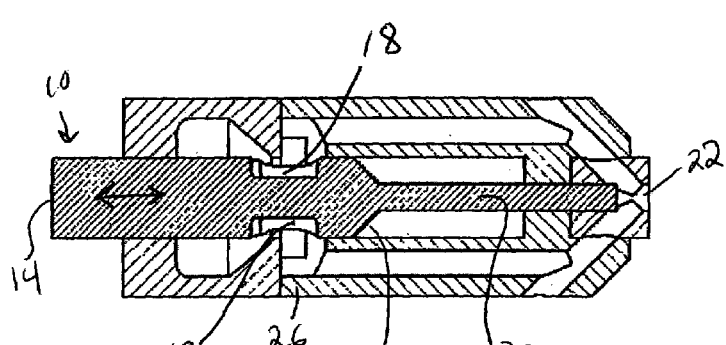
FIG. 3B illustrates the device of FIG. 3A shown in cross section.

In one embodiment, the spool valve includes a valve pin 20 attached to the spool valve to provide a positive seal at a gate 22. Such closure has been found beneficial to reduce cycle times and improve part quality. Atmospheric pressure can be provided in a central portion 24 of a drop 26 through a venting port 28 (FIG. 2B). Preferably, the venting ports 28 lead air displace by the movement of the spool valve 10 to and from the outside of the drop 26.

Figure 5:
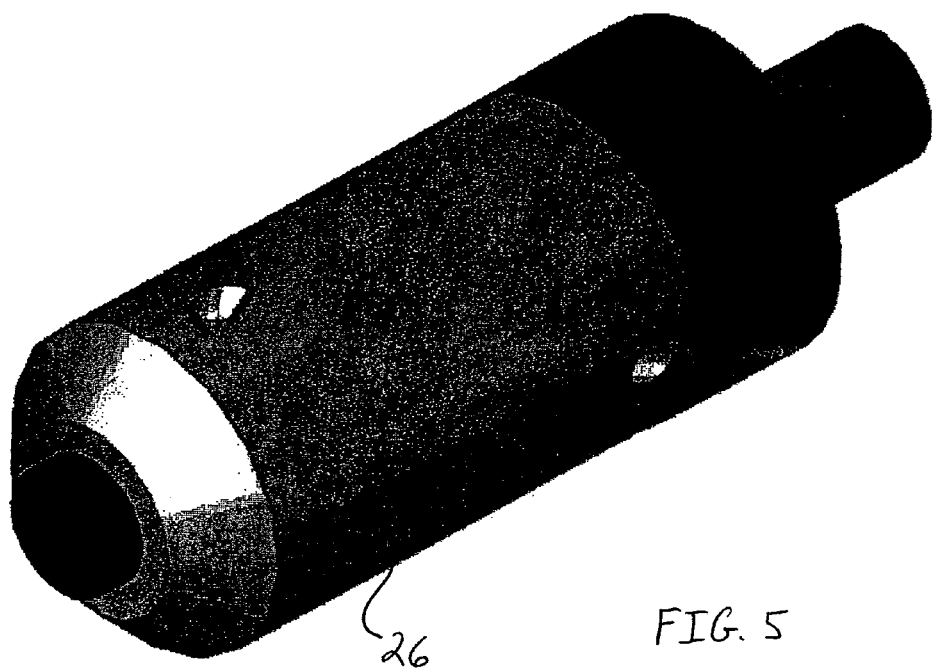
FIG. 5 illustrates the device of the present invention shown in a perspective view.

FIGS. 4 and 5 illustrate the system of the present invention assembled within the drop 26, including spool valve 10 positioned therein. As shown the spool valve is capable of axial movement.

In use, the melt pressure will act on the exposed area at the tip of the valve pin 20. The resulting force on the valve pin will be proportional to the melt pressure and the square of the valve pin diameter. As such, it is desirable to provide as small a valve pin as is suitable for the application within possible diameters including diameters in the range of about 2 mm to 8 mm. Since the flow rate at a given pressure drop is proportional to the fourth power of the gate diameter, an 8 mm pin diameter can provide 256 times the flow rate of a 2 mm pin diameter.

The present invention provides a means for utilizing smaller pin diameters by reducing the pin's susceptibility to buckling. In addition, if a pin were to fail, the spool valve with the extended valve pin may simply be removed from the melt delivery system.

The spool valve preferably includes at least one recess through which the polymer melt flow can flow when the spool valve is appropriately positioned. The recess defines the flow port 18. While a two flow port 18 design is shown in the FIGS., any number of flow ports including three, four, or more can be used. Ideally, the flow ports and/or the passages feeding the flow ports should be positioned to avoid transverse loads on the spool valve. Excess transverse loads are undesirable because they require heightened actuation forces and produce wear on the machine elements. The use of flow ports allows also allows the spool valve of the present invention to have an annulus shape down the length of the valve.

In the design of the sliding spool valve, the flow ports provide the means for controlling the rate of volumentric flow and pressure drop through the valve. When the spool valve is in a full forward position, the flow ports are not connected to the source of the plastic melt. As the spool valve is retracted, an increased area of the flow port is exposed to the plastic melt and an increasing volumetric flow rate will be delivered through the spool valve. The geometry of the flow ports can be predetermined to provide differential volumetric flow rates as a function of position.

While not shown in the FIGS., it is possible to use multiple sets of flow ports down the axis of the device to simultaneously provide flow control of multiple materials. In such an application, two or more manifolds would feed the different materials to the spool valve, and the spool valve would be actuated to control the flow and/or pressure of one, the other, or both materials.

The position of the spool valves can be controlled in an open and/or closed loop fashion according to a variety of actuation means. Open loop control can be provided wherein the position of the valve is profiled in the filling stage of the injection molding process to provide a varying volumetric flow rate through the spool valve as the mold cavity fills. Open loop control can also be provided wherein the pressure on the valve is profiled such that the position of the spool valve dynamically changes to provide a proportional pressure at the tip of the extended valve pin. Closed loop control can also be used, wherein the location of the spool valve and or the melt pressure at varying locations and/or the load on the spool valve are observed and utilized to change the position of the spool valve to alter the volumetric flow rate or pressure at the spool valve.

The spool valve can preferably be moved through a variety of designs including electric, pneumatic, hydraulic, screws, gears, and other power transmission elements. As discussed, the spool valve has minimal actuation forces required for control and the forces acting on the system will be dominated by the melt pressure acting on the pin tip used for closure of the valve gate 22. Preferably, actuators can rapidly actuate the spool valve/valve pin, and also hold position without consuming excessive power. Such exemplary actuators include a ball screw rotated by an electric or pneumatic motor and a hydraulic cylinder.

There are several benefits to using an electric motor, which offsets its disadvantages which include high cost, low operating temperature, and low power density. First, the electric motor avoids the use of fragile and costly pneumatic or hydraulic hoses. Second, the electric motor provides very fast initial response time. Third, the electric motor provides a method for estimating the load on the valve pin and thereby estimating the melt pressure by monitoring current consumption. Fourth, the electric motor provides a method for estimating the position of the spool valve by monitoring motor command signals. Since electric motors provide low torque at high speed, it is desirable to provide gearing to provide higher torque as required by the molding application.

The spool valve of the present invention provides several advantages over the prior art including that the sliding spool valve with extended valve pin provides for a simpler design with few components. The sliding spool valve also has no projections which prevent removal or insertion from the hot runner system. In addition, the valve has a very low actuation force, so it can be actuated through less expensive, more compact actuators, thereby providing not only faster, more accurate control, but also the ability to place more valve gates in a feed system. Another advantage is that the valve can provide for controlled co-injection of multiple materials by maintaining the separation of melt streams to the flow inlets. The valve pin is preferably subjected to compressive loads rather than axial loads. Since the axial thrust load on the valve pin is proportional to the pressure and area at the tip of the extended valve pin, cavity pressure may be estimated by estimating the force on the valve pin.

A person having ordinary skill in the art will appreciate that the foregoing is only illustrative of the principles of the invention, and that various modifications can be made by those skilled in the art without departing from the scope and spirit of the invention. All references cited herein are expressly incorporated by reference in their entirety, and specifically provisional application serial No. 60/423,395 from which this application claims priority.

The invention claimed is:

1. A plastic melt flow control apparatus, comprising:
   a spool valve having at least one recessed area;
   a housing positioned around the spool valve and the spool valve being capable of axial movement within the housing;
   a flow port defined by the recessed area and an adjacent wall of the housing; and passageways for directing the polymer melt flow to a gate positioned downstream from the flow port
   whereby axial movement of the spool value controls the flow of plastic melt through the flow port.

2. The apparatus of claim 1, wherein the spool valve is exposed to atmospheric pressure on both a top surface and a bottom surface.

3. The apparatus of claim 1, wherein more than one flow port is included.

4. The apparatus of claim 3, wherein the flow ports are arranged to provide balanced forces on the spool valve.

5. The apparatus of claim 3, wherein at least two different polymer flow melts are directed through at least two different flow ports.

6. The apparatus of claim 1, wherein the leading shape of the flow port consists of a circular arc.

7. The apparatus of claim 1, wherein venting ports provide a path from outside the apparatus to an internal cavity.

8. The apparatus of claim 7, wherein the bottom surface of the spool valve is disposed in the internal cavity.

9. The apparatus of claim 8, wherein the internal cavity is maintained at atmospheric pressure by the venting ports.

10. The apparatus of claim 1, wherein the spool valve includes an extended valve pin to provide closure at the gate.

11. The apparatus of claim 10, wherein axial movement of the spool valve controls the flow of polymer melt through both the flow port and the gate.

* * * * *